United States Patent [19]

Winchell

[11] 4,137,985

[45] Feb. 6, 1979

[54] VEHICLE SECURITY SYSTEM

[75] Inventor: Frank J. Winchell, Orchard Lake, Mich.

[73] Assignee: General Motors Corporation, Detroit, Mich.

[21] Appl. No.: 854,530

[22] Filed: Nov. 25, 1977

[51] Int. Cl.² .............................................. B60R 24/02
[52] U.S. Cl. ..................................... 180/114; 70/237; 70/252; 70/257; 307/10 AT; 340/63
[58] Field of Search ............... 180/101, 111, 112, 114; 70/237, 238, 239, 252, 255, 256, 257; 307/10 AT; 340/63

[56] References Cited

U.S. PATENT DOCUMENTS

| | | | |
|---|---|---|---|
| 2,061,978 | 11/1936 | Penka | 70/255 |
| 2,796,755 | 6/1957 | Craig | 70/239 |
| 3,680,335 | 10/1972 | Onishi | 70/252 |
| 3,824,403 | 7/1974 | McGuirk, Jr. | 307/10 AT |
| 4,035,791 | 7/1977 | Katayama | 340/274 R |

Primary Examiner—Joseph F. Peters, Jr.
Assistant Examiner—Donn McGiehan
Attorney, Agent, or Firm—Albert F. Duke

[57] ABSTRACT

A vehicle security system includes a door locking mechanism and control circuitry which prevents access to the vehicle interior unless a door lock key is used thus making it unnecessary to specifically lock the doors upon exiting the vehicle. Steering shaft lock means are also energizable by operation of the door lock key permitting elimination of the ignition key and lock cylinder.

6 Claims, 3 Drawing Figures

VEHICLE SECURITY SYSTEM

This invention relates to security systems for motor vehicles and, more particularly, to a system which is designed to reduce theft by employing an electromagnetical door latching mechanism energizable by operation of a door lock key from the exterior of the vehicle and by eliminating the need for an ignition key while retaining the usual steering column locking functions by employing an electromechanical steering shaft locking mechanism which is energizable to permit steering shaft rotation by operation of the afore-mentioned door lock key and maintain an energized state as long as the vehicle seat is occupied.

Many vehicle thefts result from a failure to remove the ignition key upon leaving the vehicle or if the key is removed, failure to lock the vehicle doors. Vehicles are presently provided with audible or visual reminder devices to remind the driver to remove the ignition key before leaving the vehicle. Nevertheless, a substantial problem still exists. In accordance with the present invention the problem of leaving the ignition key in the ignition lock is solved by eliminating the ingition key and performing the functions presently performed thereby through other means. Furthermore, in accordance with the present invention the necessity for locking the vehicle doors is eliminated by removing the mechanical unlatching mechanism in present use so that the vehicle door automatically assumes a latched position when closed and can be opened from the exterior of the vehicle only by use of the door lock key. The door releasing mechanism includes a motor which is energized to unlatch the vehicle door upon operation of the door lock key. In addition, a steering column lock solenoid is provided which responds to the door lock key operation to release the vehicle steering shaft and permit maneuvering of the vehicle. The steering column lock solenoid is held in an energized state as long as the driver's seat is occupied. Time delay circuitry is provided to prevent inadvertent deenergization of the steering column lock solenoid during vehicle operation due to movement of the passenger on the vehicle seat.

A more complete understanding of the present invention may be had from the following detailed description which should be read in conjunction with the drawings, in which.

Figure 1:
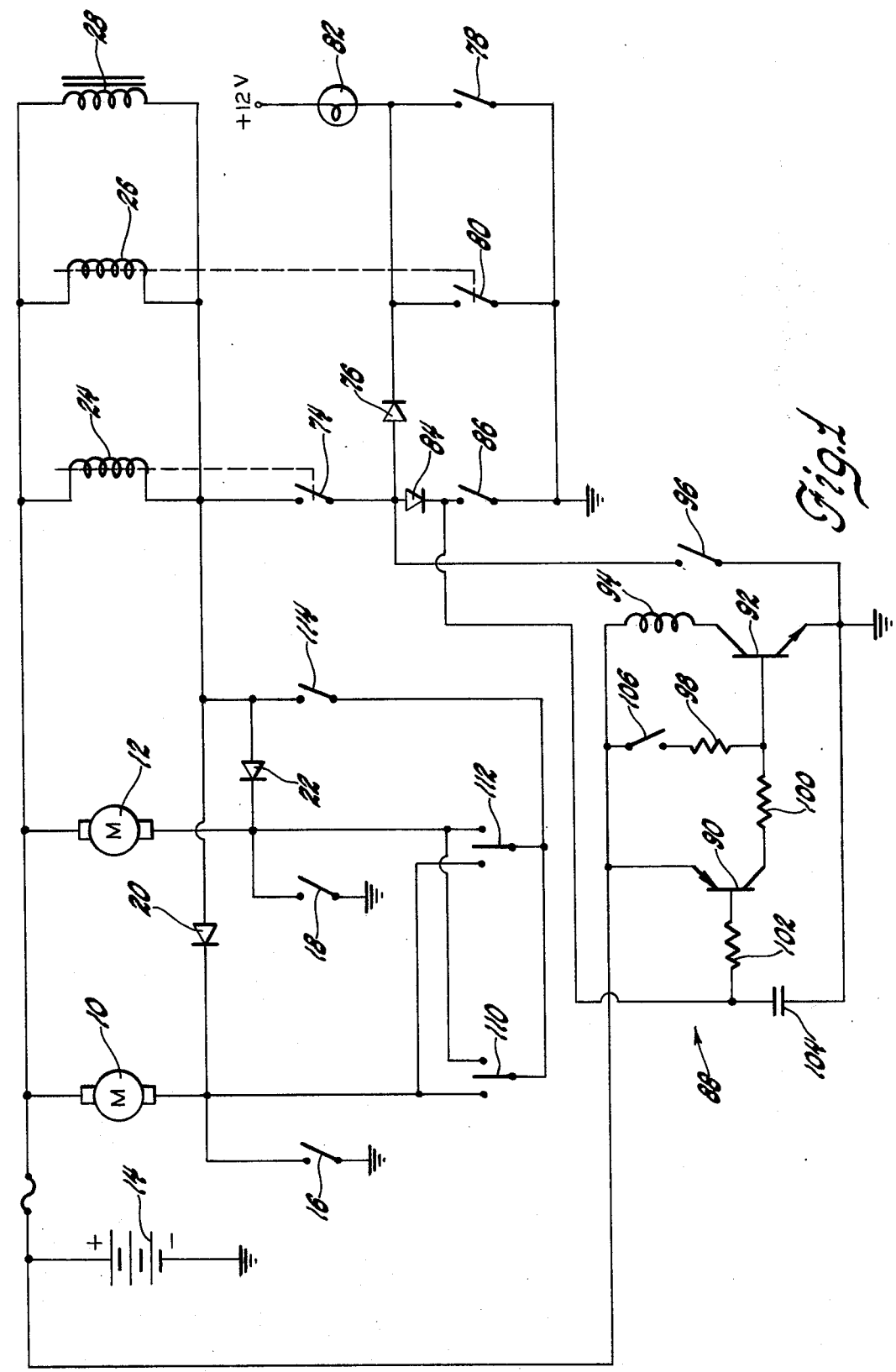
FIG. 1 is a schematic diagram of the system of the present invention.
Figure 3:
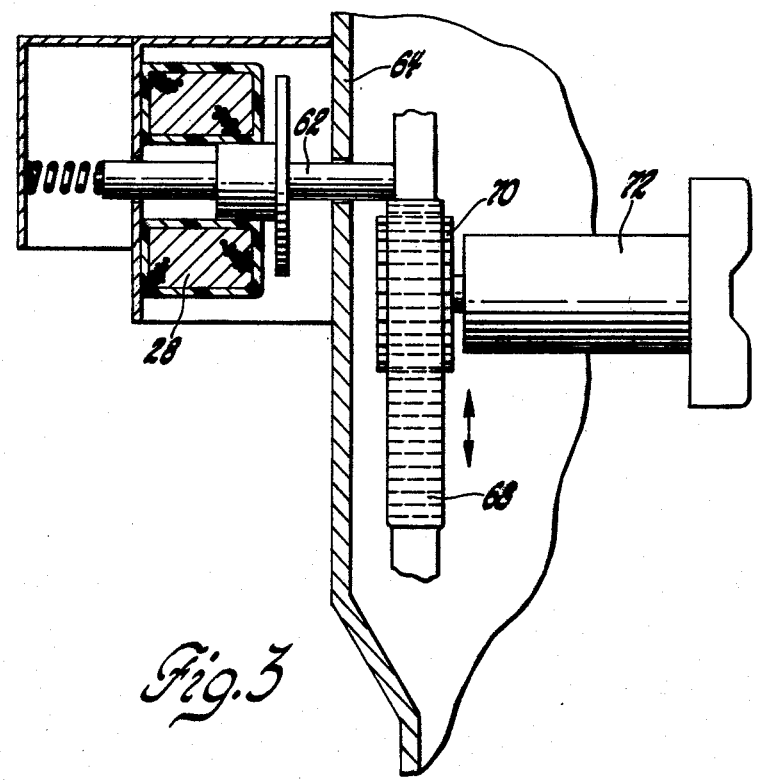
FIG. 3 is a broken away perspective view of the electromechanical steering column and ignition lock suitable for use in the present invention.

Referring now to the drawings and initially to FIG. 1, the system includes a release motor 10 provided for operating the driver's door latch and a release motor 12 for operating the passenger's door latch. The motors 10 and 12 are connected to a source of direct current such as the vehicle battery 14 and to respective key actuated switches 16 and 18, which are actuable from the exterior of the vehicle on the driver and passenger sides of the vehicle, respectively. The key switches 16 and 18 are also connected through diodes 20 and 22, respectively, to relays 24 and 26 and a steering column and ignition lock solenoid 28 so that the relays 24 and 26 and the solenoid 28 are energized concurrently with either the driver's door release motor 10 or the passenger's door release motor 12 as a result of actuation of the switches 16 or 18, respectively. Energization of the release motors 10 or 12 effect unlatching of the vehicle door. This unlatching operation is that which takes place in the present day vehicles when the exteriorly located push-button or door handle is operated. Any suitable door latching mechanism which permits access to the interior of the vehicle only by energization of the release motor 10 is suitable for the present invention. An example of one mechanism is shown in FIG. 3 and will be described hereinafter. The steering column and ignition lock solenoid 28 performs the function of unlocking the steering column and ignition switch which is accomplished on present day vehicles by operation of the ignition key.

Figure 2:
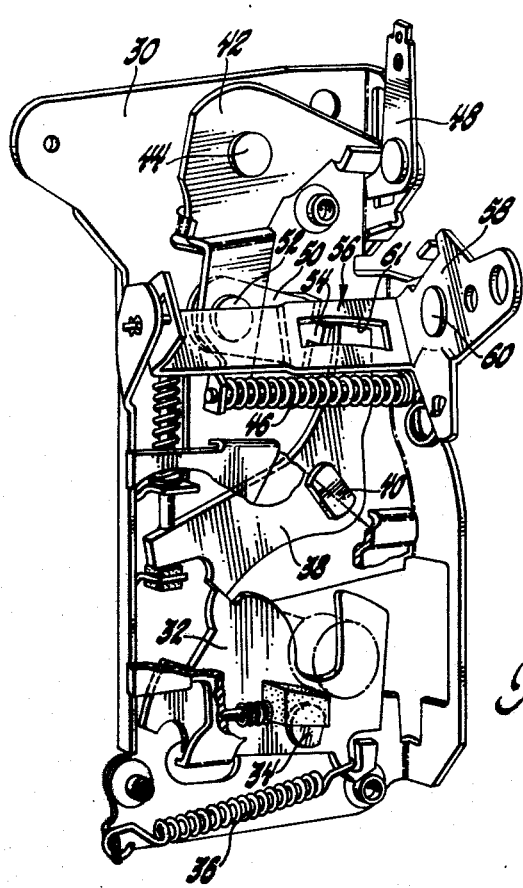
FIG. 2 is a broken away perspective view of a door lock suitable for use in the present invention.

The latch mechanism shown in FIG. 2 is substantially the same as that shown in the U.S. Pat. to Cockburn No. 3,695,663. The mechanism includes a main frame 30. An inverted fork-type bolt 32 is pivoted at 34 to the frame 30 for movement between a latched position as shown to an unlatched position. A coil tension spring 36 biases the bolt 32 clockwise to an unlatched position. The bolt 32 is maintained in a latched position by a detent 38 which is pivoted at 40 to the frame 30. An operating lever 42 is pivoted at 44 to the frame 30. The lever 42 is pivotable in a counterclockwise direction against the bias of a spring 46 by a lever 48. The lever 48 is connected by suitable means with an inside handle mounted on the inner panel of the door. An intermittent member 50 pivoted at 52 to the lever 42 includes a lateral tab having an extension 54. A locking lever 56 includes a flange 58 which is pivoted at 60 to pivotally mount the locking lever 56 to the frame 30 for movement between an unlocked position as shown to a locked position. The flange 58 is connected by a rod (not shown) with an inside garnish button (not shown). The locking lever 56 includes a slot 61 which receives the tab extension 54. The latch shown in FIG. 2 is substantially the same as that shown in FIG. 3 of the afore-mentioned patent, except that the lever 42 and the locking lever 56 cannot be operated from the exterior of the vehicle. In accordance with the present invention the detent member 38 of the latch mechanism in the driver and front passenger doors is coupled to the release motors 10 and 12, respectively, so as to be pivoted in a clockwise direction upon energization of the release motor. Thus, once the vehicle door has been closed the only way it may be opened from the exterior of the vehicle is by use of the key to close the appropriate switch 16 or 18.

As shown in FIG. 3, the solenoid 28 is provided with a plunger 62 which extends through the steering column housing 64 and prevents movement of a rack 68. The rack 68 is driven by a toothed wheel 70 coupled to an actuator 72. Energization of the solenoid 28 retracts the plunger 62 to permit clockwise rotation of the actuator 72 and toothed wheel 70 which drives the rack 68 to an unlocked position wherein the usual bolt (not shown) attached to the rack 68 is moved to a position permitting steering shaft rotation. Coincidentally, the ignition switch is moved to a closed position. More detailed information regarding the steering shaft lock bolt mechanism may be had by reference to the U.S. Pat. No. to White 3,638,462.

Returning now to FIG. 1, the relay 24 controls a switch 74 which is connected to ground through a diode 76 and parallel connected switches 78 and 80. The switch 78 is the usual door jam switch which is moved to a closed position when the door is opened. The switch 80 is controlled by the relay 26 which is a time delay relay. The vehicle interior lamps depicted at 82 are energized as a result of closure of either of the switches 78 or 80. If the lamps are energized by the closure of the switch 80 they will remain energized until the time delay relay 26 releases to open the switch 80. The switch 74 is also connected to ground through a diode 84 and a seat occupancy responsive switch 86. The switch 86 is opened when the seat is vacant and closes when the seat is occupied. The diode 76 isolates the switch 86 from the interior lamps 82. Thus, the solenoid 28 remains energized through one of the switches 78, 80, 86 and the switch 74 after opening of the switch 16. The relay 24 insures that the solenoid 28 must first be energized from the switch 16 to prevent unauthorized door opening from enabling the solenoid 28.

Time delay circuitry generally designated 88 is provided to prevent momentary opening of the switch 86, as a result of passenger movement in the seat, from affecting the circuit. The time delay circuitry 88 comprises transistors 90, 92, relay 94 and relay operated switch 96, resistors 98, 100 and 102, and capacitor 104. When the occupant enters the vehicle and occupies the seat, the switch 86 closes to discharge the capacitor 104 turning on the transistors 90, 92 and energizing the relay 94 to close the switch 96 and maintains an energizing circuit for the solenoid 28. As soon as the driver closes the ignition switch 106, the transistor 92 will remain energized regardless of the condition of the seat switch 86. Any bouncing or momentary opening and closing of the switch 86 prior to closure of the ignition switch 106 does not affect the solenoid 28 since the transistor 90 will remain conductive until the capacitor 104 charges to a threshold value. When the ignition switch 106 is opened and the seat is vacated and the doors closed, the capacitor 104 will begin to charge and after a time interval determined by the values of the resistor 102 and capacitor 104 will turn off the transistor 90 which turns off the transistor 92 and deenergized the relay 94. The subsequent opening of the contacts 96 deenergizes the relay 24 and solenoid 28. Deenergization of solenoid 28 locks up the steering shaft to prevent rotation thereof.

Driver and passenger armrest switches 110 and 112, respectively, are provided for selectively energizing either of the release motors 10 or 12 from the interior of the vehicle. A speed responsive switch 114 is connected in series with the switches 110 and 112 and is moved to its closed position whenever the vehicle is below a predetermining speed. Thus, the switches 110 and 112 are ineffective and the vehicle doors cannot be unlatched whenever the vehicle is above the predetermined speed.

Having thus described my invention what I claim is:

1. A vehicle security system comprising electromechanical door latch means for releasably latching a vehicle door, electromechanical steering shaft lock means adapted when energized to permit steering shaft rotation, first switch means actuable from the exterior of said vehicle for energizing said latch means to release said vehicle door, and for energizing said steering shaft lock means to permit steering shaft rotation, second switch means actuable to a circuit closing position in response to door opening, third switch means operable in response to actuation of said first switch means, said third switch means establishing an energizing circuit between said steering shaft lock means and said second switch means whereby said steering shaft lock means remains energized after deactuation of said first switch means if said vehicle door is open, fourth switch means connected in series with said third switch means and in parallel with said second switch means for providing an energizing circuit for said steering shaft lock means independent of said second switch means whereby said steering shaft lock means remains energized after door closure, and means electrically isolating said door latch means from said second, third and fourth switch means to prevent energization of said door latch means as a result of actuation of said second, third or fourth switch means.

2. A vehicle security system comprising electromechanical door latch means for releasably latching a vehicle door, electromechanical steering shaft lock means adapted when energized to permit steering shaft rotation, first switch means actuable from the exterior of said vehicle for energizing said latch means to release said vehicle door, and for energizing said steering shaft lock means to permit steering shaft rotation, second switch means actuable to a circuit closing position in response to door opening, third switch means operable in response to actuation of said first switch means, said third switch means establishing an energizing circuit between said steering shaft lock means and said second switch means whereby said steering shaft lock means remains energized after deactuation of said first switch means if said vehicle door is open, fourth switch means connected in series with said third switch means and in parallel with said second switch means for providing an energizing circuit for said steering shaft lock means independent of said second switch means in response to seat occupancy whereby said steering shaft lock means remains energized after door closure if the vehicle seat is occupied, and diode means electrically isolating said door latch means from said second, third and fourth switch means to prevent energization of said door latch means as a result of actuation of said second, third or fourth switch means.

3. A vehicle security system comprising electromechanical door latch means for releasably latching a vehicle door, electromechanical steering shaft lock means adapted when energized to permit steering shaft rotation, first switch means actuable from the exterior of said vehicle for energizing said latch means to release said vehicle door, and for energizing said steering shaft lock means to permit steering shaft rotation, second switch means actuable to a circuit closing position in response to door opening, third switch means operable in response to actuation of said first switch means, said third switch means establishing an energizing circuit between said steering shaft lock means and said second switch means whereby said steering shaft lock means remains energized after deactuation of said first switch means if said vehicle door is open, fourth switch means connected in series with said third switch means and in parallel with said second switch means for providing an energizing circuit for said steering shaft lock means independent of said second switch means in response to seat occupancy whereby said steering shaft lock means remains energized after door closure if the vehicle seat is occupied, and time delay means connected with said fourth switch means to prevent deenergization of said steering column lock means for a predetermined time interval following deactuation of said fourth switch means.

4. A vehicle security system comprising electromechanical door latch means for releasably latching a vehicle door, electromechanical steering shaft lock means adapted when energized to permit steering shaft rotation, first switch means actuable from the exterior of said vehicle for energizing said latch means to release said vehicle door, and for energizing said steering shaft lock means to permit steering shaft rotation, second switch means actuable to a circuit closing position in response to door opening, third switch means operable in response to actuation of said first switch means, said third switch means establishing an energizing circuit between said steering shaft lock means and said second switch means whereby said steering shaft lock means remains energized after deactuation of said first switch means if said vehicle door is open, fourth switch means connected in series with said third switch means and in parallel with said second switch means for providing an energizing circuit for said steering shaft lock means independent of said second switch means in response to seat occupancy whereby said steering shaft lock means remains energized after door closure if the vehicle seat is occupied, and fifth switch means operable from the interior of said vehicle and connected in parallel with said diode means and operable when actuated to establish an energizing circuit for said door latch means through said second and fourth switch means.

5. A vehicle security system comprising electromechanical door latch means for releasably latching a vehicle door, electromechanical steering shaft lock means adapted when energized to permit steering shaft rotation, first switch means actuable from the exterior of said vehicle for energizing said latch means to release said vehicle door, and for energizing said steering shaft lock means to permit steering shaft rotation, second switch means actuable to a circuit closing position in response to door opening, third switch means operable in response to actuation of said first switch means, said third switch means establishing an energizing circuit between said steering shaft lock means and said second switch means whereby said steering shaft lock means remains energized after deactuation of said first switch means if said vehicle door is open, fourth switch means connected in series with said third switch means and in parallel with said second switch means for providing an energizing circuit for said steering shaft lock means independent of said second switch means in response to seat occupancy whereby said steering shaft lock means remains energized after door closure if the vehicle seat is occupied, and sixth switch means responsive to vehicle speed and connected in series with said fifth switch means to prevent energization of said door latch means when the vehicle is above a predetermined speed.

6. A vehicle security system comprising electromechanical door latch means for releasably latching a vehicle door, electromechanical steering shaft lock means adapted when energized to permit steering shaft rotation, key actuable switch means actuable from the exterior of said vehicle for energizing said latch means to release said vehicle door and for energizing said steering shaft lock means to permit steering shaft rotation, a door jam switch actuable to a circuit closing position in response to door opening, a relay operable in response to actuation of said key actuable switch means and including relay contact means establishing, upon energization of said relay, an energizing circuit between said steering shaft lock means and said door jam switch means whereby said steering shaft lock means remains energized after the actuation of said key actuable switch means if said vehicle door is open, seat occupancy responsive switch means connected in series with said relay contact means and in parallel with said door jam switch for providing an energizing circuit for said steering shaft lock means independent of said door jam switch, whereby said steering shaft lock means remains energized after door closure if the vehicle seat is occupied, diode means electrically isolating said door latch means from said relay switch means, time delay means connected with said seat occupancy responsive switch means to prevent deenergization of said steering column lock means unless said seat occupancy responsive switch has been deactuated for a predetermined interval of time, operator actuable switch means actuable from the interior of said vehicle and connected in parallel with said diode means and operable when actuated to establish an energizing circuit for said door latch means through said relay switch means and said seat occupancy responsive switch means, vehicle speed responsive switch means connected in series with said operator actuable switch means to prevent energization of said door latch means when the vehicle is above a predetermined speed.

* * * * *